United States Patent
Latz et al.

(10) Patent No.: US 6,293,167 B1
(45) Date of Patent: Sep. 25, 2001

(54) UNIVERSAL JOINT FOR VEHICLE STEERING SYSTEM

(75) Inventors: Frederick E. Latz, Bradenton; Ronald C. Singleterry, Sarasota; Andrew K. Stiteler; Terry W. Craftchick, both of Bradenton, all of FL (US)

(73) Assignee: IMO Industries, Inc., Sarasota, FL (US)

( * ) Notice: Subject to any disclaimer, the term of this patent is extended or adjusted under 35 U.S.C. 154(b) by 0 days.

(21) Appl. No.: 09/481,294

(22) Filed: Jan. 11, 2000

Related U.S. Application Data

(63) Continuation of application No. 09/168,757, filed on Oct. 8, 1998.

(51) Int. Cl.[7] ............................... F16D 3/16; B62D 1/18
(52) U.S. Cl. ............................................. 74/493; 464/112
(58) Field of Search ............................ 464/112, 106, 464/905; 74/493

(56) References Cited

U.S. PATENT DOCUMENTS

| | | | |
|---|---|---|---|
| 105,696 | * | 7/1870 | Keller ................................ 464/112 |
| 123,049 | * | 1/1872 | Roper et al. ...................... 464/112 |
| 791,087 | * | 5/1905 | Deutsch ............................. 464/112 |
| 1,232,600 | * | 7/1917 | Peck .................................. 464/112 |
| 1,272,740 | * | 7/1918 | Wanders ............................ 464/112 |
| 1,676,436 | * | 7/1928 | Hamlin .............................. 464/112 |
| 2,104,101 | * | 1/1938 | Rosenbaum ....................... 464/112 |
| 2,471,665 | * | 5/1949 | Williams ........................... 464/112 |
| 2,474,529 | * | 6/1949 | Hullinger ........................... 464/112 |
| 2,504,197 | * | 4/1950 | Hunick .............................. 464/112 |
| 2,687,024 | * | 8/1954 | George .............................. 464/112 |
| 2,997,864 | * | 8/1961 | Rueb .................................. 464/112 |
| 3,796,112 | | 3/1974 | Hoffman ............................. 74/493 |
| 4,135,372 | | 1/1979 | Benson ................................ 64/17 |
| 4,274,268 | | 6/1981 | Taig ..................................... 64/7 |
| 4,317,338 | | 3/1982 | Jordan ................................. 64/7 |
| 4,498,888 | * | 2/1985 | Pastor ................................ 464/112 |
| 4,543,848 | | 10/1985 | Beauch ............................... 74/493 |
| 4,560,368 | * | 12/1985 | Sherman, II et al. ............ 464/112 |
| 4,685,897 | | 8/1987 | Krude ................................ 464/141 |
| 4,834,658 | | 5/1989 | Kotani et al. ....................... 439/8 |
| 4,850,239 | | 7/1989 | Oosterwal .......................... 74/493 |
| 4,941,766 | | 7/1990 | Carlson ............................. 403/131 |
| 5,136,894 | | 8/1992 | Carter et al. ...................... 74/493 |
| 5,358,445 | | 10/1994 | Wuebker ........................... 464/112 |
| 5,423,722 | | 6/1995 | Beauch et al. .................... 464/151 |
| 5,676,081 | | 10/1997 | Kobelt .............................. 114/144 |
| 5,728,004 | | 3/1998 | Dziegielewski .................... 464/70 |

* cited by examiner

*Primary Examiner*—David A. Bucci
*Assistant Examiner*—Colby Hansen
(74) *Attorney, Agent, or Firm*—Jansson, Shupe & Munger, Ltd.

(57) ABSTRACT

A universal joint is provided having a generally cup-shaped yolk. The yolk includes a base and a generally cylindrical wall projecting therefrom. The wall partially defines a cavity in the yolk. A shaft extends a longitudinal axis and has a ball on the first end thereof. The ball is receivable within the cavity and the yolk. Mounting structure is provided for pivotably supporting the ball in the cavity of the yolk.

9 Claims, 3 Drawing Sheets

UNIVERSAL JOINT FOR VEHICLE STEERING SYSTEM

RELATED APPLICATION

This application is a continuation of application Ser. No. 09/168,757, filed on Oct. 8, 1998.

BACKGROUND AND SUMMARY OF THE INVENTION

This invention relates to vehicle steering systems, and in particular, to a universal joint for use in tilt steering mechanisms.

Vehicle steering systems having tilt steering mechanisms are commonly used in both land and water vehicles. For example, in a land vehicle such as an automobile, a driver may tilt the steering wheel to its maximum upward position to facilitate the ingress and egress for the vehicle. The smaller the vehicle, the more convenience that is afforded by the tilt steering mechanism.

Similarly, tilt steering mechanisms for marine vehicles facilitate a driver's ingress and egress to the helm seat. However, the application of a tilt steering mechanism to a marine vehicle presents significant challenges for designers due to the wide spread use of hydraulic steering in such vehicles.

In a typical hydraulic steering arrangement, the steering wheel of the marine vehicle is mechanically coupled to a hydraulic pump. The turning of the steering wheel delivers pressurized oil from one of two pump ports depending on the direction of the turn. The pressurized oil is delivered to one of two ends of a hydraulic cylinder that, in turn, pivots an outboard engine, a rudder or the like.

An example of an improved tilt steering mechanism for marine vehicle is shown in U.S. patent application Ser. No. 08/798,832 filed on Feb. 12, 1997, assigned to the assignee of the present invention, and incorporated herein by reference. In the '832 application, the steering shaft is interconnected to the driving shaft of a hydraulic pump by a universal joint. As is known in the art, the universal joint includes two cross pins that ride in a trunnion block. While universal joints of this type are acceptable in most marine applications, the cost of such universal joints can be significant. Consequently, it is highly desirable to develop a low-cost alternative to prior art universal joints.

Therefore, it is a primary object and feature of the present invention to provide a universal joint which is less expensive to manufacture.

It is a further object and feature of the present invention to provide a universal joint for a tilt steering mechanism which is stronger and less likely to fail in response to large loads.

It is a still further object and feature of the present invention to provide a universal joint for use in a tilt steering mechanism which minimizes the "play" of a steering wheel.

It is a still further object and feature of the present invention to provides universal joint for a tilt steering mechanism which can be easily assembled.

In accordance with the present invention, a universal joint is provided. The universal joint includes a generally cup-shaped yolk having a ball receiving cavity therein. A shaft extends along a longitudinal axis and has first and second ends. A ball is mounted to a first end of the shaft. The ball is receivable within the ball receiving cavity in the yolk. A connection structure is provided for interconnecting the ball and the yolk.

The ball may include a slot extending therethrough along an axis perpendicular to the longitudinal axis of the shaft. An insert is receivable within the slot of the ball. The insert includes a passageway extending therethrough. The connection structure, such as a pin, extends through the passageway in the insert and interconnects the yolk to the shaft, thereby allowing the shaft to be pivotable about the pin.

It is contemplated that the insert be generally disc-shaped and have a predetermined diameter which is less than the width of the slot in the ball.

In order to connect the shaft of the universal joint to a steering wheel, the second end of the shaft may be threaded. Further, the base of the yolk may include a key receiving slot therein for receiving the keyed end of the driving shaft of the hydraulic pump.

In accordance with a still further aspect of the present invention, a universal joint is provided having a generally cup-shaped yolk. The cup-shaped yolk includes a base and a generally cylindrical wall projecting therefrom. The wall partially defines a cavity therein. A shaft extends along a longitudinal axis and has a ball at a first end thereof. The ball is receivable in the cavity of the yolk. Mounting structure is provided for pivotably supporting the ball in the cavity of the yolk.

The ball may include a slot extending therethrough for receiving an insert therein. The mounting structure includes a pin which extends through a passageway in the insert so as to interconnect the cylindrical wall of the yolk to the ball.

In yet a still further aspect of the present invention, a tilt steering mechanism for a vehicle is provided. The tilt steering mechanism includes a driving shaft and a steering wheel interconnected by a universal joint such that rotation of the driving wheel correspondingly rotates the steering shaft. The universal joint includes a yolk defining a cavity therein, and a shaft having a first end pivotably supported within the cavity in the yolk. A locking structure is provided for selectively locking the shaft of the universal joint at a predetermined angle to the driving shaft.

The shaft of the universal joint may include a slot therein in order to accommodate a woodruff key. It is contemplated that the steering wheel include a central hub having a passageway for receiving the shaft of the universal joint therethrough. The passageway is defined by a generally cylindrical inner wall of the central hub. The inner wall of the hub includes a recess therein for receiving a portion of the woodruff key in a conventional manner. The recess communicates with the passageway through the central hub.

It is further contemplated that the first end of the shaft of the universal joint include an enlarged head thereon. The enlarged head including a slot therethrough. An insert is receivable within the slot in the enlarged head of the shaft of the universal joint. The insert includes a passageway therethrough. The shaft of the universal joint is pivotably mounted to the yolk by a pin extending through the yolk and through the passageway in the insert. The insert is generally disc-shaped and has an predetermined diameter approximating the diameter of the enlarged head of the shaft of the universal joint.

Various other features, objects and advantages will be made apparent from the following description taken together with the drawings.

BRIEF DESCRIPTION OF THE DRAWINGS

The drawings furnished herewith illustrate a preferred construction of the present invention in which the above advantages and features are clearly understood as well as others which will be readily understood from the following description of the illustrated embodiment. In the drawings.

DETAILED DESCRIPTION OF THE PREFERRED EMBODIMENT

Figure 1:
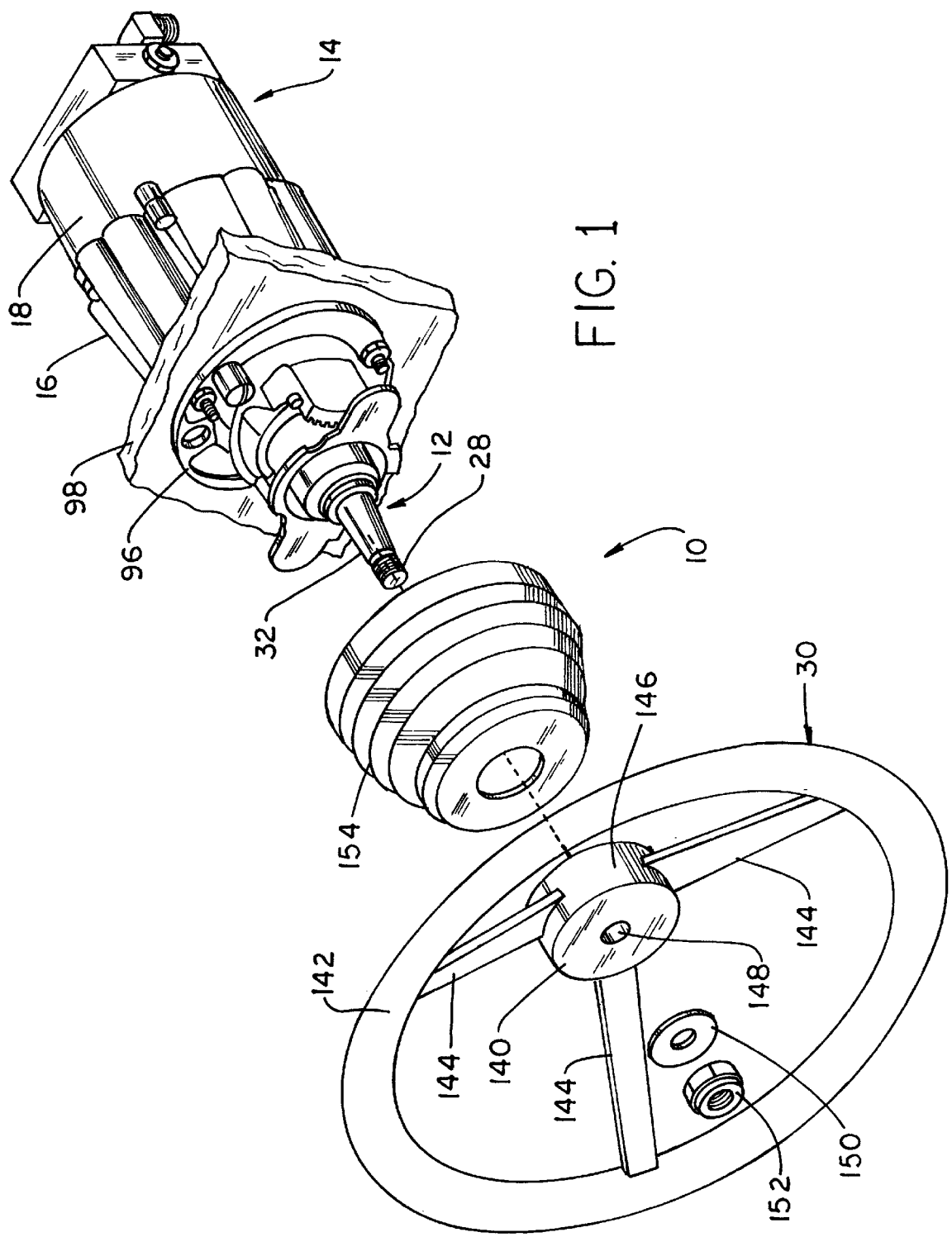
FIG. 1 is a partially exploded, isometric view of a steering unit having a tilt steering mechanism incorporating the universal joint of the present invention.

Referring to FIG. 1, a tilt steering mechanism 10 incorporating the universal joint 12 of the present invention is shown. Tilt steering mechanism 10 includes a helm unit 14 extending along a longitudinal axis. As is conventional, helm unit 14 includes a hydraulic pump, pilot check valve assembly, relief valve and reservoir supported within front and rear housing components 16 and 18, respectively. Front housing 16 includes a yolk receiving cavity 20 into which a driving shaft 22 extends for driving the hydraulic pump (not shown) of helm unit 14.

Figure 3:
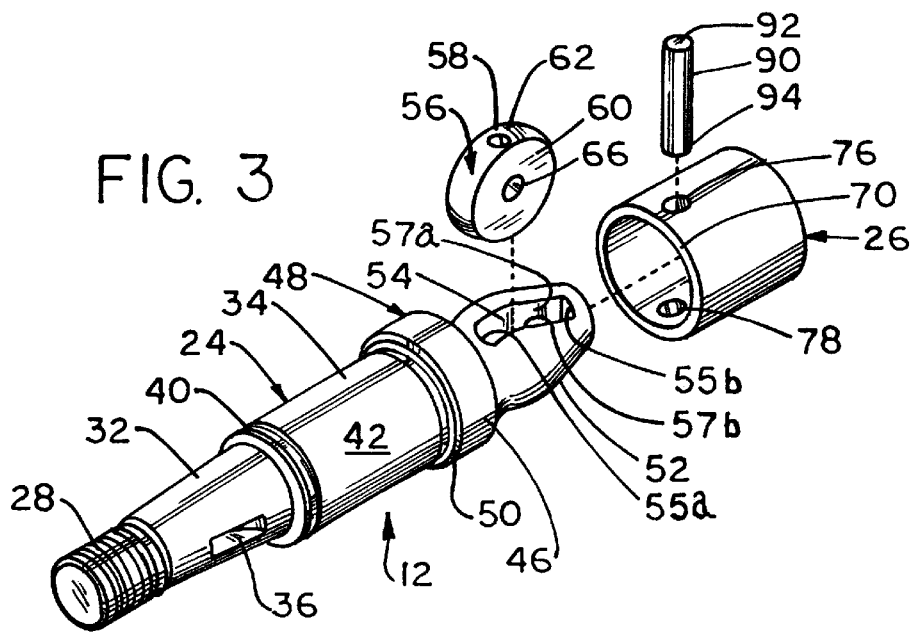
FIG. 3 is an exploded, isometric view of the universal joint of the present invention.
Figure 4:
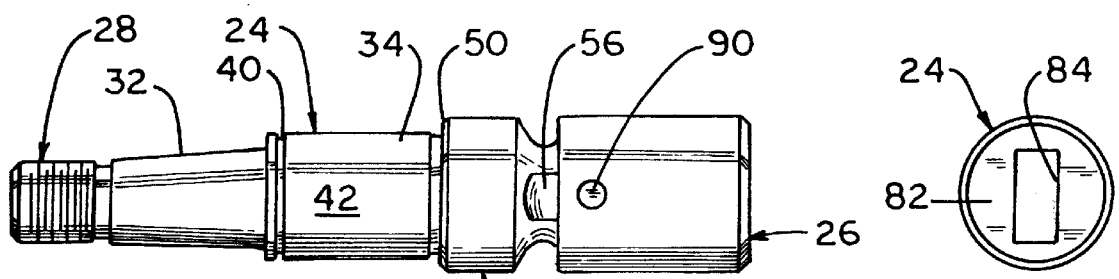
FIG. 4 is a side elevational view of the universal joint of the present invention.
Figure 5:
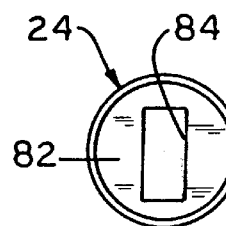
FIG. 5 is an end view of the universal joint of the present invention.

Referring to FIG. 3, universal joint 12 includes a steering shaft 24 extending along a longitudinal axis and a yolk 26. Steering shaft 24 includes a first threaded end 28 adapted for receiving steering wheel 30 thereon, FIG. 1, in a manner hereinafter described. A tapered body portion 32 interconnects threaded end 28 with a generally cylindrical central body portion 34 of steering shaft 24. Tapered body portion 32 includes a slot 36 having an arcuate cross-section for receipt of a woodruff key 38 therein in a conventional manner.

Figure 2:
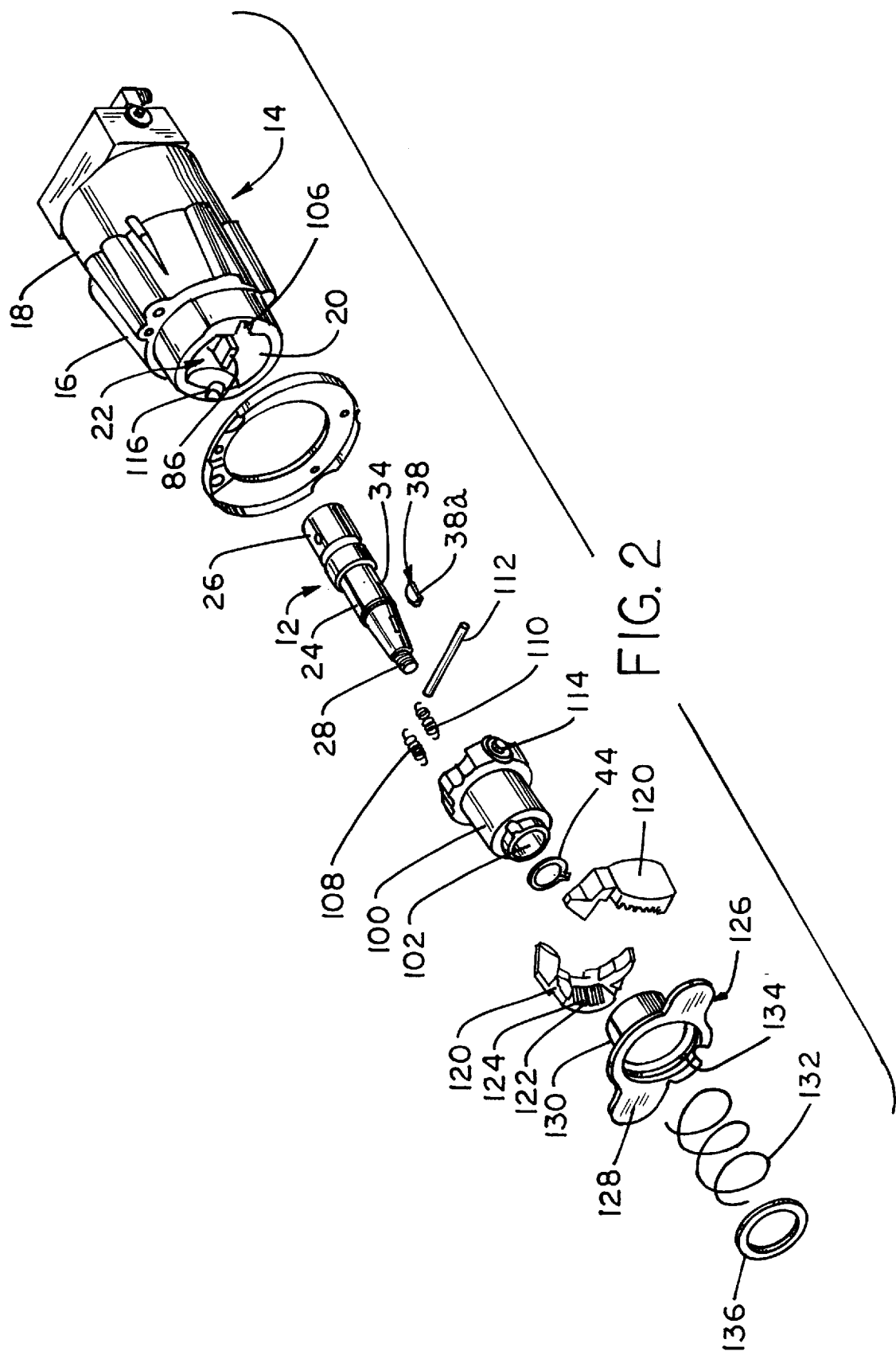
FIG. 2 is an exploded, isometric view of the tilt steering mechanism of FIG. 1.

Central body portion 34 of steering shaft 24 includes a groove 40 extending about the outer cylindrical surface 42 thereof at a location adjacent tapered body portion 32. Groove 40 is adapted for receiving a retaining ring 44, FIG. 2, for reasons hereinafter described. Central body portion 34 of steering shaft 24 further includes an enlarged neck 46 which extends about the outer periphery of external surface 34 at a location adjacent an opposite end 48 of steering shaft 24. Neck 46 defines a shoulder 50 in external surface 42 of central body portion 34. It is preferred that neck 46 be dimensioned for receipt in swivel housing 100.

An enlarged head or ball 52 is mounted on opposite end 48 of steering shaft 24. Ball 52 includes an elongated slot 54 having a predetermined width defined between side walls 55a and 55b, and a predetermined height defined between side walls 57a and 57b. Slot 54 extends along an axis transverse to the longitudinal axis of steering shaft 24, and is dimensioned for receiving a generally disc-shaped insert 56 therein.

Insert 56 includes first and second opposite faces 58 and 60, respectively, interconnected by an outer edge 62. The height of insert 56 is slightly less than the predetermined height of slot 54 in ball 52 so as to provide minimal clearance between faces 58 and 60 of insert 56 and corresponding walls 57a and 57b in ball 52. The diameter of insert 56 is slightly less then the predetermined width of slot 54 in ball 52 so as to provide minimal clearance between outer edge surfaces 62 and sidewalls 55a and 55b in ball 52.

Insert 56 further includes a pin receiving passageway 64 therethrough having a length generally equal to the diameter of insert 56, and a second passageway 66 extending between faces 58 and 60 which communicates with pin receiving passageway 64. Second passageway 66 is intended to carry grease for lubricating the pivotal connection hereinafter described between steering shaft 24 and yolk 26.

Figure 6:
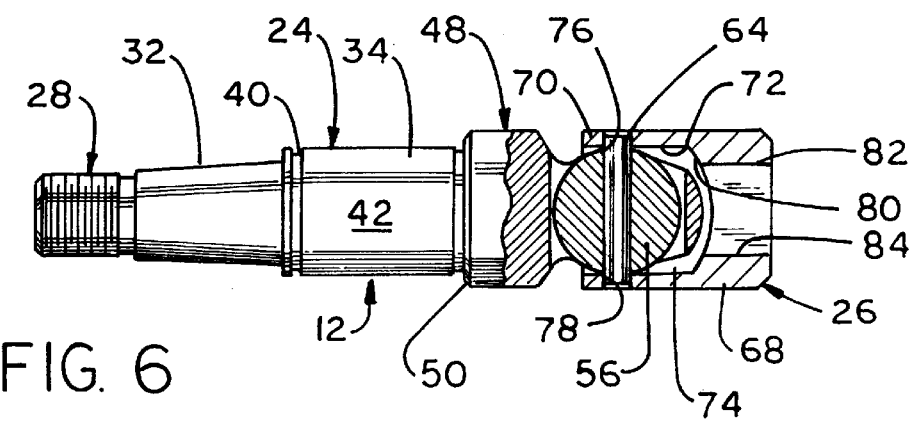
FIG. 6 is a top plan view, partially in section, showing the universal joint of a present invention.

Yolk 26 includes a base portion 68 having a generally cylindrical wall 70 projecting therefrom. Cylindrical wall 70 includes first and second axially aligned apertures 76 and 78, respectively, therein and has an inner surface 72 which partially defines a ball receiving cavity 74 in yolk 26. Ball receiving cavity 74 has a diameter slightly greater than the diameter of insert 56 so as to provide minimal clearance between inner surfaces 72 of yolk 26 and the outer edge surface 62 of insert 56 when ball 52 is received therein, FIG. 6.

Base 68 of yolk 26 includes an inner surface 80 which partially defines ball receiving cavity 74, and a generally flat outer surface 82 which is perpendicular to cylindrical wall 70. A slot 84 extends between the inner surface 80 of base 68 and the outer surface 82 of base 62 and communicates with ball receiving cavity 74 in yolk 26. Slot 84 has a predetermined configuration to form a mating relationship with a keyed end 86 of driving shaft 22.

In order to assemble universal joint 12, insert 56 is positioned within slot 54 in ball 52 of steering shaft 24 such that pin receiving passageway 64 is perpendicular to the longitudinal axis of steering shaft 24. Ball 52 of steering shaft 24 is inserted into ball receiving cavity 74 in yolk 26 such that pin receiving passageway 64 is axially aligned with first and second axially aligned apertures 76 and 78, respectively, in cylindrical wall 70 of yolk 26. Pin 90 is inserted through aperture 76 in cylindrical wall 70 of yolk 26 such that a first end 92 of pin 90 is seated within apertures 76 in cylindrical wall 70 of yolk 26 and a second end 94 is seated within aperture 78 in cylindrical wall 70 of yolk 26 so as to capture insert 56 thereon. As a result, steering shaft 24 may pivot about pin 90. The grease carried in second passageway 64 in insert 56 is intended to lubricate pin 90 and facilitate the ability of steering shaft 24 to pivot with respect to yolk 26.

It is contemplated that end 92 and 94 of pin 90 be retained in corresponding apertures 76 and 78 of yolk 26 in any suitable manner such as by staking, welding or the like.

With steering shaft 24 pivotably mounted to yolk 26 as hereinafter described, yolk 26 is inserted into yolk receiving cavity 20 in front housing 16 of helm unit 14 such that keyed end 86 of driving shaft 22 is received within slot 84 in base 62 of yolk 26. Rotation of yolk 26 results in the turning of driving shaft 22. Depending upon the direction of the turn, pressurized oil is delivered to one of two ends of a hydraulic cylinder that, in turn, pivots an outboard engine, a rudder or the like.

Referring to FIG. 1, tilt steering mechanism 10 further includes a mounting plate 96 which is interconnected to front housing 16 of helm unit 14 so as to capture control panel 98 therebetween. Tilt steering mechanism 10 further includes a swivel housing 100 having a steering shaft passageway 102 extending therethrough. Swivel housing 100 is slid axially over universal joint 12 such that threaded end 28 of steering shaft 24 extends through swivel housing 100 and such that neck 46 is seated within the interior of passageway 102 in swivel housing 100. Swivel housing 100 is interconnected to the forward end 106 of front housing 16 of helm unit 14 through springs 108 and 110. First ends of springs 108 and 110 are interconnected to swivel housing 100, while the second, opposite ends of springs 108 and 110 are interconnected to a spring anchor 112 which is mounted on the forward end 106 of front housing 16 of helm unit 14. Springs 108 and 110 bias swivel housing 100 toward the forward end 106 of front housing 16 of helm unit 14.

Swivel housing 100 further includes trunnions 114 which project laterally therefrom. Trunnions are adapted for receipt in corresponding recesses 116 in the forward end 106 of front housing 16 of helm unit 14 so as to allow swivel housing 100 to pivot with respect thereto.

Retaining ring 44 is seated in groove 40 in the central body portion 34 of steering shaft 24 so as to maintain swivel housing 100 on steering shaft 24.

Two C-shaped locking clamps 120 are mounted to the forward end 106 of front housing 16 of helm unit 14 so as to capture swivel housing 100 therebetween. Each locking clamp 120 extends approximately 180O around swivel housing 100, and includes an inner surface having a plurality of grooves 122 alternating with a plurality of ridges 124. The grooves 122 and the ridges 124 converge at a pivot axis extending through trunnions 114 of swivel housing 100.

Tilt steering mechanism 10 further includes a latch 126 having a grasping plate 128 with a tubular locking device projecting pivotably therefrom. Tubular locking device 130 includes first and second wedged-shaped locking members which are circumferentially spaced 180° from one another and which are generally parallel to longitudinal axis of steering shaft 24. A compression spring 132 fits into an annular groove 134 in latch 126 and into a corresponding annular groove in retaining ring 136. Compression spring 132 urges latch 126, and hence, wedged-shaped locking members into engagement with corresponding grooves 122 into a respective C-shaped clamps 120 so as to secure swivel housing 100 at a fixed angle with respect to the longitudinal axis of helm unit 14.

In order to mount steering wheel 30 onto helm unit 14, woodruff key 38 is positioned within corresponding slot 36 in steering shaft 24 of universal joint 12 such that flat side 38a of woodruff key 38 faces outward from steering shaft 24. As is conventional, steering wheel 30 has a central hub 140 and an outer grasping portion 142 having a plurality of spokes 144 extending therebetween. Spokes 144 are circumferentially spaced about the outer surface 146 of central hub 140. Central hub 140 further includes a passageway 148 therethrough for receipt of the steering shaft 24 of universal joint 12. Passageway 148 in central hub 140 includes a groove for accommodating woodruff key 38.

To mount steering wheel 30 on steering shaft 24 of universal joint 12, groove in passageway 148 of central hub 140 is axially aligned with woodruff key 38 positioned within slot 36 in steering shaft 24. Steering wheel 30 is axially pushed over the threaded end 28 of steering shaft 24 such that the threaded end 28 projects through passageway 148 in central hub 30. Washer 150 is positioned over threaded end 28 of steering shaft 24 and nut 152 is threaded thereon so as to secure steering wheel 30 to steering shaft 24 of universal joint 12.

It is contemplated that a boot 154 be positioned over the forward end of helm unit 14 between central panel 98 and steering wheel 30 in order to discourage access thereto.

In order to change the angular position of steering wheel 30 and hence, swivel housing 100 relative to helm unit 14, the user grasps the grasping portions 128 of latch 126 with the fingertips (while retaining the grasp of central hub 140 of steering wheel 30) and urges the latch 126 toward the steering wheel 30 until latch 126 and its locking members disengage from corresponding grooves 122. After such disengagement, the swivel housing 100 and steering wheel 30 may be tilted to a different angle. After reaching its desired angle, the latch 126 is released, the spring 132 biases the latch 26 to re-engage its locking members with corresponding grooves 122 in clamps 120. The pivot connection between steering shaft 24 and yolk 26 of universal joint 12 allows steering wheel 30 and swivel housing 100 to pivot over the desired range of angles with respect to helm unit 14.

As is evident from the above description, rotation of steering wheel 30 turns steering shaft 24 of universal joint 12 therewith, which in turn, rotates yolk 26. Insert 56 distributes the load of ball 52 of steering shaft 24 during rotation of yolk 26. As a result, universal joint 12 may accommodate additional load thereon. As heretofore described, yolk 26 is interconnected to the keyed end 86 of driving shaft 22 such that rotation of yolk 26 rotates driving shaft 22 in a common direction.

As is conventional, rotation of driving shaft 22 drives a hydraulic pump. Hence, turning steering wheel 30 delivers pressurized oil from one of two pump ports depending on the direction of the turn. The pressurized oil is delivered to one of two ends of a hydraulic cylinder, which in turn, pivots an outboard engine, a rudder or the like.

While universal joint 12 has been shown for use in connection with a tilt steering mechanism incorporating a hydraulic pump, is contemplated as being the scope of the present invention to incorporate universal joint in other types of steering or load transmitting mechanisms such as a conventional cable and pulley system.

Various modes of carrying out the invention are contemplated as being within the scope of the following claims, particularly pointing out and distinctly claiming the subject matter regarded as the invention.

I claim:

1. A universal joint, comprising:
   a generally cup-shaped yoke having a ball-receiving cavity therein;
   a shaft extending along a longitudinal axis and having first and second ends;
   a ball mounted to the first end of the shaft and being receivable within the ball-receiving-cavity in the yoke the ball including a slot extending therethrough along an axis perpendicular to the longitudinal axis of the shaft and having a predetermined width which is defined by first and second walls within the ball;
   a disc-shaped insert receivable within the slot of the ball the insert having a predetermined diameter approximating the width of the slot through the ball and including a passageway extending therethrough; and
   connection structure for interconnecting the ball and the yoke, the connection structure consisting of a pin extending through the passageway in the insert and interconnected to the yoke whereby the shaft is pivotable about the pin.

2. The universal joint of claim 1 wherein the slot in the ball has a predetermined height, the height of the slot approximating the height of the disk.

3. The universal joint of claim 1 wherein the second end of the shaft is threaded.

4. The universal joint of claim 1 wherein the yoke includes a base having a generally cylindrical outer wall projecting therefrom, the outer wall partially defining the ball-receiving cavity.

5. The universal joint of claim 4 wherein the base includes a key-receiving slot therein.

6. The universal joint of claim 4 wherein the outer wall of the yoke includes first and second apertures therethrough, the apertures being in axial alignment with each other, and wherein the connection structure includes a pin extending through the apertures in the outer wall of the yoke and through the ball.

7. A universal joint, comprising:

a generally cup-shaped yoke having a base and a generally cylindrical wall projecting therefrom, the wall partially defining a cavity therein and including first and second apertures therethrough, the apertures being in axial alignment with each other;

a shaft extending along a longitudinal axis and having a ball on a first end thereof, the ball receivable in the cavity in the yoke and including a slot therethrough having a height and width which is defined by first and second walls within the ball;

a disc-shaped insert receivable within the slot of the ball, the disc-shaped insert having a passageway extending therethrough; and mounting structure for pivotably supporting the ball in the cavity in the yoke, the mounting structure consisting of a pin extending through the apertures in the wall of the yoke and through the passageway through the insert.

8. The universal joint of claim 7 wherein the diameter of the insert approximates the height of the slot in the ball.

9. The universal joint of claim 7 wherein the base of the yoke includes a key-receiving slot therein.

* * * * *